(12) United States Patent
Kim

(10) Patent No.: US 7,746,316 B2
(45) Date of Patent: Jun. 29, 2010

(54) LIQUID CRYSTAL DISPLAY DEVICE INCLUDING A CIRCUIT BOARD INCLUDING AN INVERTER WITH A DRIVING CIRCUIT PART

(75) Inventor: Kwan-Ho Kim, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 944 days.

(21) Appl. No.: 11/340,381

(22) Filed: Jan. 26, 2006

(65) Prior Publication Data

US 2006/0267918 A1 Nov. 30, 2006

(30) Foreign Application Priority Data

May 11, 2005 (KR) ............... 10-2005-0039381

(51) Int. Cl.
*G09G 3/36* (2006.01)
(52) U.S. Cl. ..................................... 345/102
(58) Field of Classification Search ............ 345/102, 345/103; 361/749, 760
See application file for complete search history.

(56) References Cited

U.S. PATENT DOCUMENTS

| 2003/0214478 | A1* | 11/2003 | Yoo et al. | 345/102 |
| 2004/0004596 | A1* | 1/2004 | Kang et al. | 345/102 |
| 2004/0150609 | A1* | 8/2004 | Kim | 345/100 |
| 2005/0264515 | A1* | 12/2005 | Oh et al. | 345/102 |

* cited by examiner

*Primary Examiner*—Richard Hjerpe
*Assistant Examiner*—Shaheda A Abdin
(74) *Attorney, Agent, or Firm*—Innovation Counsel LLP

(57) ABSTRACT

A liquid crystal display (LCD) comprising an LCD panel on which an electrode pad is provided; a driving part connected to the electrode pad and applying a driving signal to the LCD panel; a light source part providing light to a rear surface of the LCD panel; and a circuit board comprising a driving circuit part applying a driving control signal to the driving part and an inverter providing a light source driving voltage to the light source part. Accordingly, the LCD may improve work efficiency in a modular assembly process and decrease voltage overload of a voltage converter.

17 Claims, 4 Drawing Sheets

LIQUID CRYSTAL DISPLAY DEVICE INCLUDING A CIRCUIT BOARD INCLUDING AN INVERTER WITH A DRIVING CIRCUIT PART

CROSS-REFERENCE TO RELATED APPLICATIONS

This application claims the benefit of Korean Patent Application No. 2005-0039381, filed on May 11, 2005, in the Korean Intellectual Property Office, the disclosure of which is incorporated herein by reference.

BACKGROUND OF THE INVENTION

1. Field of the Invention

The present invention relates to a liquid crystal display, and more particularly, to a liquid crystal display comprising an inverter providing a light source driving voltage to a light source.

2. Description of the Related Art

Generally, a liquid crystal display (hereinafter, referred to as 'LCD') is a device displaying an image, with liquid crystal cells aligned in a matrix form where the light transmittance of the cells is adjusted according to an image signal. The LCD forms an image on an LCD panel using light radiated from a backlight unit.

The LCD comprises an LCD panel on which liquid crystal cells formed in a pixel unit and aligned in a matrix form are formed, a driving part driving the liquid crystal cells, a driving circuit part provided with a circuit pattern to control the driving part, a backlight unit uniformly providing light to the LCD panel, a bottom chassis accommodating the above and an inverter providing a voltage to the backlight unit.

Here, the driving part comprises a driving chip and a FPC (flexible printed circuit) on which the driving chip is mounted and the driving circuit part comprises a voltage converter converting inputted voltages into needed voltage values and a circuit pattern generating a signal to control the driving part. The driving circuit part is connected to one side of the FPC and disposed on rear of the bottom chassis.

The inverter generates a light source control signal controlling and driving a light source and provides a light source driving voltage to a light source part according to the light source control signal. The inverter is manually screwed on one side or the rear surface of the bottom chassis.

However, since the driving circuit part and the inverter are respectively disposed on the predetermined places by hand work and it takes a long time in a modular assembly process of the LCD, working efficiency becomes low. Accordingly, mass-production of the LCD is adversely affected.

Moreover, the driving circuit part comprises a voltage converter converting inputted voltages into at least one of voltages needed to drive the LCD, such as a gate-on voltage, a gate-off voltage, a reference voltage (AVDD) and etc. However, as the voltage converter generates a high reference voltage so as to improve high image quality and response time, the voltage converter is disadvantageously overloaded.

SUMMARY OF THE INVENTION

Accordingly, it is an aspect of the present invention to provide a liquid crystal display improving efficiency in a modular assembly process and decreasing overload of a voltage converter.

The foregoing and/or other aspects of the present invention are achieved by providing a liquid crystal display (LCD) comprising an LCD panel on which an electrode pad is provided; a driving part connected to the electrode pad and applying a driving signal to the LCD panel; a light source part providing light to the LCD panel; and a circuit board comprising a driving circuit part applying a driving control signal to the driving part and an inverter providing a light source driving voltage to the light source part.

According to the embodiment of the present invention, the LCD further comprises a light guiding plate disposed on the LCD panel and a bottom chassis accommodating the light guiding plate, wherein the light source part is disposed along one side of the light guiding plate.

According to the embodiment of the present invention, the circuit board is disposed on a rear surface of the bottom chassis where the light source part is disposed.

According to the embodiment of the present invention, the circuit board further comprises a voltage converter.

According to the embodiment of the present invention, the voltage converter comprises a transformer converting a direct current voltage into an alternating current voltage.

According to the embodiment of the present invention, the voltage converter converts voltages inputted from outside into a driving circuit voltage provided to the driving circuit part and the light source driving voltage provided to the inverter, respectively.

According to the embodiment of the present invention, the driving circuit voltage comprises at least one of a gate-on voltage, a gate-off voltage and a reference voltage, and is applied to the driving circuit part.

According to the embodiment of the present invention, the light source part comprises a light source irradiating light to a rear surface of the LCD panel and wires connecting the light source and the inverter, respectively, and the inverter generates a light source controlling signal to control and drive the light source part and has a connecting terminal connected to the wires.

According to the embodiment of the present invention, the light source driving voltage comprises an initial driving voltage turning on the light source part, a normal driving voltage applied to the light source part after the initial driving voltage is applied, and an excess driving voltage applied when the light source part is not driven by the initial driving voltage.

According to the embodiment of the present invention, the connecting terminal is disposed on one edge of the circuit board.

According to the embodiment of the present invention, the light source part comprises one of a CCFL (Cold Cathode Fluorescent Lamp) and an EEFL (External Electrode Fluorescent Lamp).

According to the embodiment of the present invention, the driving circuit part and the inverter are respectively provided by the surface mount technology (SMT) on the same circuit board.

According to the embodiment of the present invention, a voltage-providing connecter and a voltage converter are provided on the driving circuit part, and the voltage converter converts voltages inputted through the voltage-providing connector into a gate-on voltage or a gate-off voltage.

According to the embodiment of the present invention, a voltage-providing connector and a voltage converter are provided on the inverter and the voltage converter coverts voltages inputted through the voltage-providing connector into a light-driving voltage and a reference voltage, respectively.

According to the embodiment of the present invention, the reference voltage is applied to the driving circuit part.

According to the embodiment of the present invention, a voltage-providing connector and a voltage converter are provided on the inverter, and the voltage converter converts voltages inputted through the voltage-providing connector into a driving circuit voltage and a light-providing voltage, respectively.

According to the embodiment of the present invention, the driving circuit voltage comprises at least one of a gate-on voltage, a gate-off voltage and a reference voltage and is applied to the driving circuit part.

BRIEF DESCRIPTION OF THE DRAWINGS

The above and/or other aspects and advantages of the present invention will become apparent and more readily appreciated from the following description of the exemplary embodiments, taken in conjunction with the accompanying drawings of which.

DETAILED DESCRIPTION OF THE PREFERRED EMBODIMENT

Figure 1:
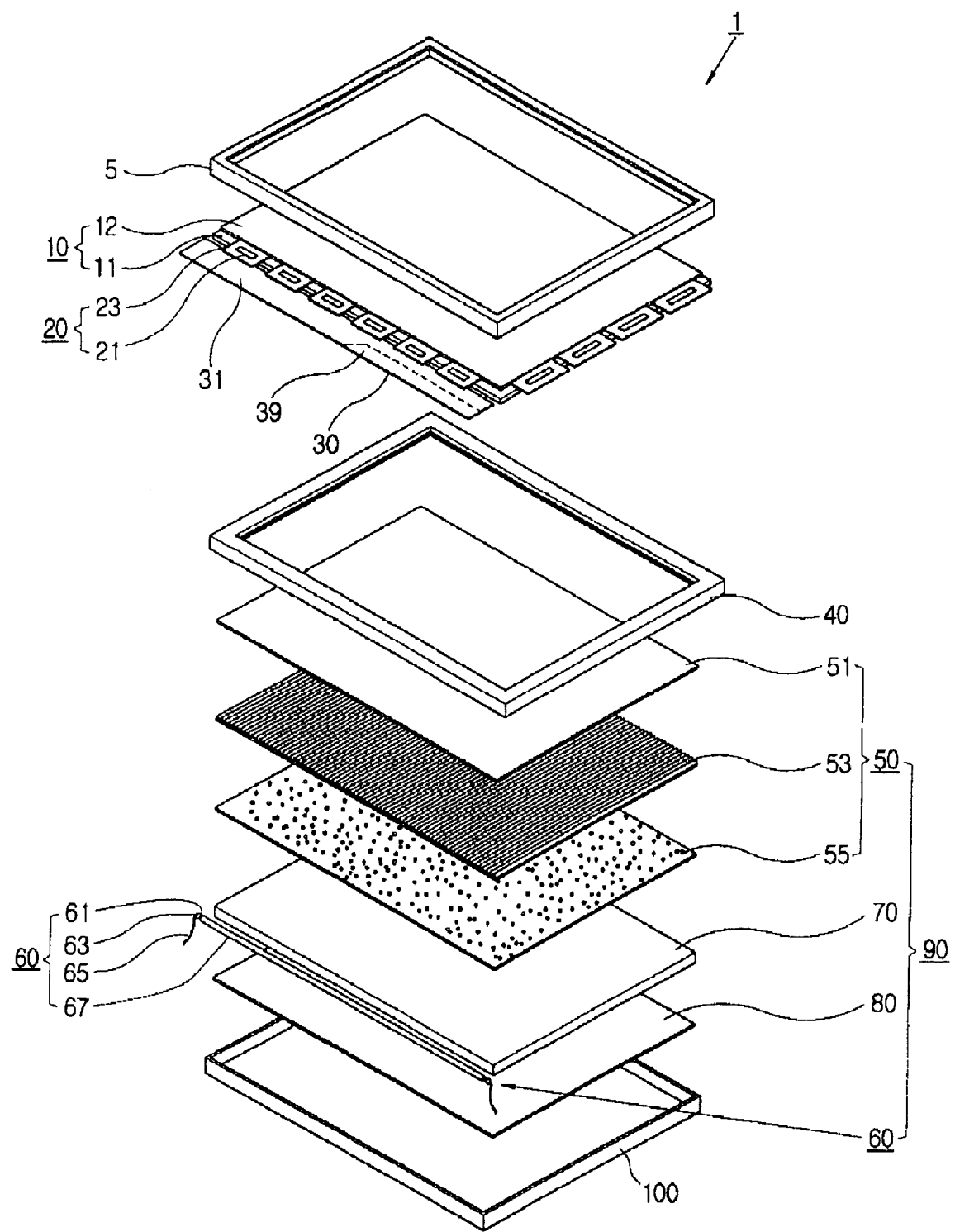
FIG. 1 is an exploded perspective view of an LCD according to a first embodiment of the present invention.

Reference will now be made in detail to exemplary embodiments of the present invention, examples of which are illustrated in the accompanying drawings, wherein like reference numerals refer to like elements throughout. The embodiments are described below in order to explain the present invention by referring to the figures.

Figure 2:
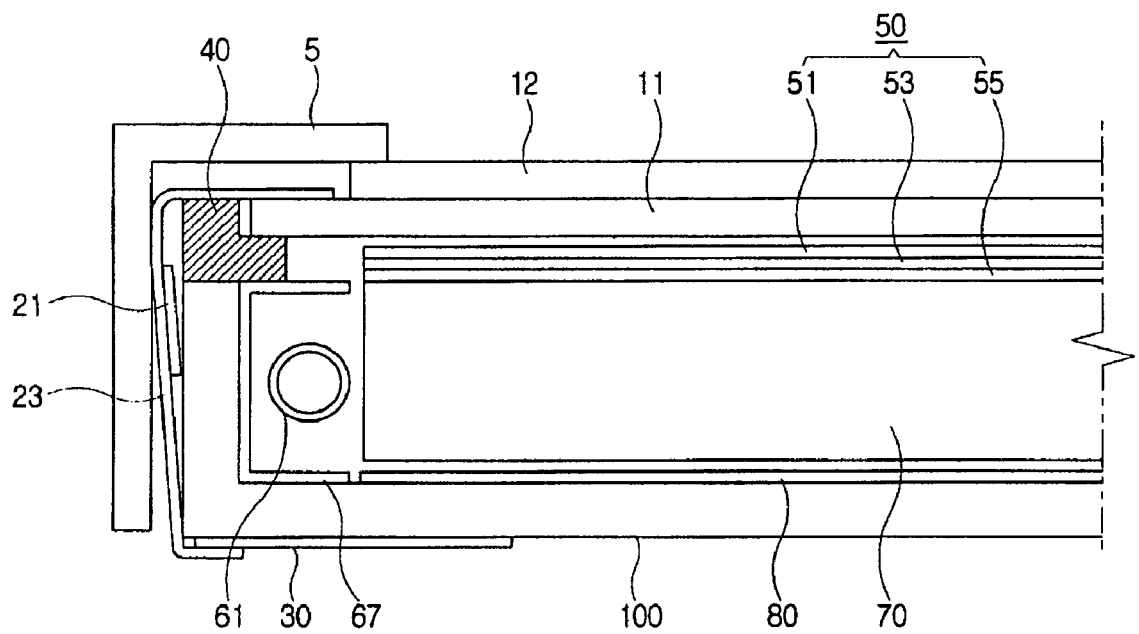
FIG. 2 is a cross-sectional view of the LCD of FIG. 1.
Figure 3:
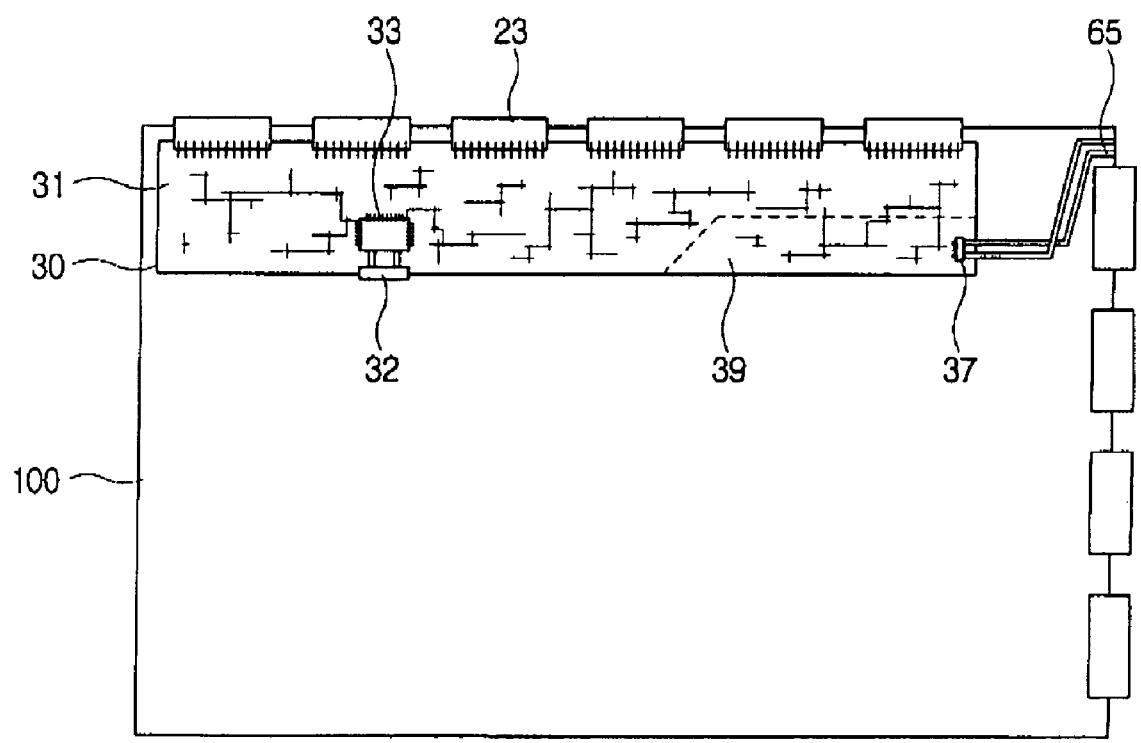
FIG. 3 is a plane view of a rear of a bottom chassis of FIG. 1.

FIG. 1 is an exploded perspective view of an LCD, FIG. 2 is a cross-sectional view of the LCD, and FIG. 3 is a plane view of a rear of a bottom chassis according to a first embodiment of the present invention.

Referring to FIG. 1, an LCD 1 comprises an LCD panel 10 on which an image is displayed; a driving part 20 driving the LCD panel 10; a driving circuit part 31 controlling the driving part 20; a mold frame 40 supporting a circumference of the LCD panel 10; a backlight unit 90 radiating light to a rear of the LCD panel 10; a bottom chassis 100 accommodating and supporting the backlight unit 90 and the mold frame 40, and an inverter 39 providing a voltage to the backlight unit 90. Here, the driving circuit part 31 and the inverter 39 are provided on the same circuit board 30.

The LCD panel 10 comprises a TFT (Thin Film Transistor) substrate 11, a color filter substrate 12 adhered facing the TFT substrate 11 and a liquid crystal, not shown, interposed between the two substrates. Also, the LCD panel 10 further comprises polarizers (not shown) respectively adhered on a front surface of the color filter substrate 12 and on a rear surface of the TFT substrate 11 so that light passing through the LCD panel 10 is crossly polarized. On the above-mentioned LCD panel 10 are aligned liquid crystal cells formed in a pixel unit and aligned in a matrix form. The liquid crystal cells generate an image by adjusting the light transmittance through the liquid crystal cells according to an image signal transmitted from the driving part 20.

A plurality of gate lines and a plurality of data lines are formed on the TFT substrate 11 in a matrix form and a TFT (not shown) is formed at the intersection of the gate line and the data line. A signal voltage transmitted from the driving part 20 is applied between a pixel electrode and a common electrode of the color filter substrate 12. Under the control of the TFT, the liquid crystal between the pixel electrode and the common electrode is aligned by the signal voltage, thereby determining light transmittance.

The color filter substrate 12 comprises color filters on which a red, a green and a blue or a cyan, a magenta and a yellow color filter are repeatedly formed on the boundary of a black matrix and a common electrode. The common electrode is comprised of transparent conductive substance such as ITO (Indium Tin Oxide), IZO (Indium Zinc Oxide), or etc. The color filter substrate 12 has a smaller area than the TFT substrate 11.

The driving part 20 comprises a driving chip 21 to apply a driving signal and a FPC (flexible printed circuit) 23 on which the driving chip 21 is mounted using a COF (chip on film) method and a first side of the FPC 23 is connected to an end of the gate line or the data line of the TFT substrate 11. The driving part 20 is extended to a rear of bottom chassis 100 with the FPC 23 being bent. The liquid crystal disposed between the TFT substrate 11 and the color filter substrate 12 moves in response to the driving signal from the driving part 20 and is realigned accordingly.

On the same circuit board 30 are provided a driving circuit part 31 connected to a second side of the FPC and provided with a circuit pattern to control the driving chip 21, and an inverter 39 providing or intercepting voltage to a light source part 60 mentioned later. In order to stably provide a voltage to the light source part 60 with short wires connecting the light source part 60 and the inverter 39, the circuit board 30 may preferably be disposed on rear of the bottom chassis 100 where the light source part 60 is disposed.

The driving circuit part 31 comprises the circuit board 30 on which a circuit pattern is provided in order to control the driving part 20 and is connected to one side of the driving part 20 extended to the rear of the bottom chassis 100 and is disposed on the rear of the bottom chassis 100.

Referring to FIG. 3, on one side of the driving circuit part 31 are provided a voltage-providing connector 32 to be provided with a voltage from an external or an internal battery or etc. and a voltage converting part 33 to convert inputted voltages into needed voltages. Inputted voltages provided to the voltage-providing connector 32 are provided to the voltage converter part 33. The voltage converting part 33 may further comprise a transformer (not shown) converting direct current voltages applied from the inverter 39 into alternating current voltages and converts inputted voltages into driving circuit voltages and light source driving voltages, thereby respectively providing to the driving circuit part 31 and to the inverter 39.

The driving circuit voltages comprise at least one of a gate-on voltage, a gate-off voltage and a reference voltage (VADD). A common voltage, a gray scale voltage and a voltage used for the driving circuit part 31 are generated from the reference voltage. A driving control signal is generated on the circuit pattern provided on the driving circuit part 31 to control the driving part 20(See FIG. 1) and at least one of the gate-on voltage, the gate-off voltage, the common voltage and the gray scale voltage is transmitted to the driving part 20 in response to the driving control signal.

The inverter 39 is affixed to one side of the same circuit board 30 where the driving circuit part 31 is provided. The inverter 39 is applied with the light source driving voltage from the voltage converter 33 provided on the driving circuit part 31. The inverter 39 generates the light source control signal to control and drive the light source part 60 (See FIG. 1). The inverter 39 comprises a connecting terminal 37 connected to wires 65 of the light source part 60. The connecting terminal 37 is an accessory connected to the wires 65 and providing the voltage applied to the inverter 39 to the light source part 60 and is disposed on one edge of the circuit board 30. Accordingly, the light source part 60 and the inverter 39 are connected with short wires 65 and the inverter 39 can provide a desired voltage to the light source part 60.

The inverter 39 generates the light source control signal to control and drive the light source part 60. The inverter 39 provides one of an initial driving voltage to turn on the light source part, a normal driving voltage provided to the light source part after the initial driving voltage is applied and an excess driving voltage provided when the light source part 60 may not be driven. The light source part 60 is controlled according to the light source control signal based on the light source driving voltage provided from the voltage converting part 33.

Here, the initial driving voltage should have about two times or more of voltage level as the normal driving voltage. This is due to a characteristic of the CCFL or the EEFL mainly used for the light source part 60. That is, in those lamps is arisen an electron emission when a strong electric field is given on a surface of the cathode, therefore high voltage is required to initially drive those lamps. After the initial driving, the normal driving voltage is applied to stably drive those lamps. However, there are situations where the light source part 60 is not driven by the initial driving voltage due to circumference influence or the like. In this case, after a sensor senses whether the light source part 60 is driven by the initial driving voltage or not, the excess driving voltage higher than the initial driving voltage is provided to the light source part 60 when the light source part 60 is not being driven.

The aforementioned inverter 39 is planned and is manufactured through the Surface Mount Technology (SMT) on the same circuit board 30 when the driving circuit part 31 is planed and is manufactured at the same time or separately. Likewise, providing the driving circuit part 31 and the inverter 39 in a single process may remove an additional process step providing and assembling a conventional inverter. Therefore, manufacturing process and processing cost may efficiently be decreased. Furthermore, when the driving circuit part 31 and the inverter 39 are provided in the same circuit board 30, space utility of the LCD becomes efficient. When the driving circuit part 31 and the inverter 39 are assembled in a single circuit board 30, work efficiency in a modular assembly process may be improved.

Moreover, since a conventional voltage applied to the driving circuit part 31 through the voltage converter 33 may respectively generate the driving circuit voltage used for the driving circuit part 31 and the light source driving voltage used for the inverter 39, it is not needed to provide boosted voltage or convert a voltage with an additional component in the driving circuit part 31 and the inverter 39. Accordingly, there may be a voltage decreasing effect and an additional material such as connecting wires or a connector may be needed.

Referring back to FIGS. 1 and 2, the mold frame 40 is formed along a circumference of the LCD panel 10, has a nearly rectangular shape and supports the LCD panel 10 separately from the backlight unit 90.

The backlight unit 90 disposed in rear of the LCD panel 10 comprises optical sheets 50, the light source part 60, a light guiding plate 70 and a reflecting sheet 80.

The optical sheets 50 comprise a protection sheet 51 disposed in rear of the LCD panel 10, a prism sheet 53 and a diffusion sheet 55. The diffusion sheet 55 comprises a base plate and a coating layer having beads formed on the base plate. The diffusion sheet 55 diffuses light from the lamp and provides the light to the LCD panel 10. Two or three sheets of the overlapping diffusion sheet 55 may be used. On the prism sheet 53 may be formed a triangular prism at a predetermined alignment. The prism sheet 53 concentrates light diffused from the diffusion sheet 55 in the perpendicular direction of a surface of the LCD panel 10. Typically, the prism sheet 53 is used in a pair and the micro prism formed on the each prism sheet 53 makes a predetermined angle with each other. Light passing through the prism sheet 53 progresses perpendicularly, thereby forming a uniform brightness distribution. The protection sheet 51 disposed on the top of the prism sheet 53 protects the prism sheet 53 which is vulnerable to scratching.

The light source part 60 comprises a light source 61 generating light, an electrode 63 provided at both ends of the light source 61, a wire 65 connected to the electrode 63 and a reflector 67 encompassing the light source 61. The light source 61 is connected to the inverter 39 through the wires 65 and is provided with the desired driving voltage. Here, the electrode 63 and the wire 65 are soldered. The light source 61 is disposed along one side of the light guiding plate 70. Although not shown in the figure, the lamp may be disposed at both sides of the light guiding plate 70 or a plurality of lamps may be disposed parallel between the two sides of the light guiding plate 70.

In the exemplary embodiment, a CCFL (Cold Cathode Florescent Lamp) is used as the light source 61, but various lamps such as HCFL (Heat Cathode Florescent Lamp) or EEFL (External Electrode Florescent Lamp) may be used.

The light guiding plate 70 is disposed along one side of the light source 61 and is disposed in the rear of the LCD panel 10, thereby leading light generated from the light source 61 to the backside of the LCD panel 10. The light guiding plate 70 comprises an incident surface provided with light from the light source 61, an exiting surface forming a perpendicular angle to the incident surface and disposed parallel with the LCD panel 10 and the rear surface on which a pattern is formed so that light irradiated from the light source 61 progresses to the exiting surface. Accordingly, the light guiding plate 70 converts light irradiated to the incident surface from the light source 61, which is disposed along one side of the light guiding plate 70, in other words, adjacent to the incident surface, into plane light and equally transmits light to the LCD panel 10 through the exiting surface. Material of the light guiding plate 70 may use PMMA (Polymethylmethacrylate) having a high strength, therefore not easily being transformed or being broken and having a good transmittance. Here, the light guiding plate 70 may be formed in a wedge type having a flat upper surface and a slant lower surface, or in a plate type having flat upper and lower surfaces. In case of an LCD employed to a small-sized product such as notebook PC or cellular phone, the light guiding plate 70 in a trapezoid-shaped may be used and the light source 61 may be provided on the lateral side of its one side which is thicker than its other side.

The reflecting sheet 80 being disposed between the light source 61 and the bottom chassis 100 reflects light from the light source 61 and provides the reflected light to the diffusion sheet 55. The reflecting sheet 80 is made of PET (polyethylene terephthalate) or PC (polycarbonate). The reflecting sheet 80 decreases light loss by reflecting light to the light guiding plate 70, which is leaked in the opposite direction of the LCD panel 10 through the light guiding plate 70 and contributes to improving the uniformity of light transmitted in the direction of the LCD panel 10 from the light guiding plate 70.

A top chassis 5 comprises a display window so that a displaying area of the LCD panel 10 may be exposed to the outside, accommodates the mold frame 40 and is combined with the bottom chassis 100.

The bottom chassis 100 accommodates the backlight unit 90 and the mold frame 40, and is combined with the top chassis 5.

In the following description, the function and efficiency of the LCD 1 having the abovementioned formation will be described. First, according to the LCD 1 of the present invention, it is not necessary to provide separate voltages to the driving circuit part 31 and to the inverter 39 respectively or to convert the voltage with an additional process, since the driving circuit voltage used in driving circuit part 31 and the light source driving voltage used in the inverter 39 may respectively be generated from the voltage provided to the conventional driving circuit part through the voltage converting part 33.

Furthermore, work efficiency in a modular assembly process may be improved, since the driving circuit part 31 and the inverter 39 are provided on the same circuit board 30 and are assembled in a single process. Also, the manufacturing cost may be decreased, since an additional process which comprises planning and manufacturing the conventional inverter and assembling it may be removed and it is not needed to use additional connecting wires and the connector.

Hereinbelow, an LCD according to a second embodiment of the present invention will be described with reference to FIG. 4.

Figure 4:
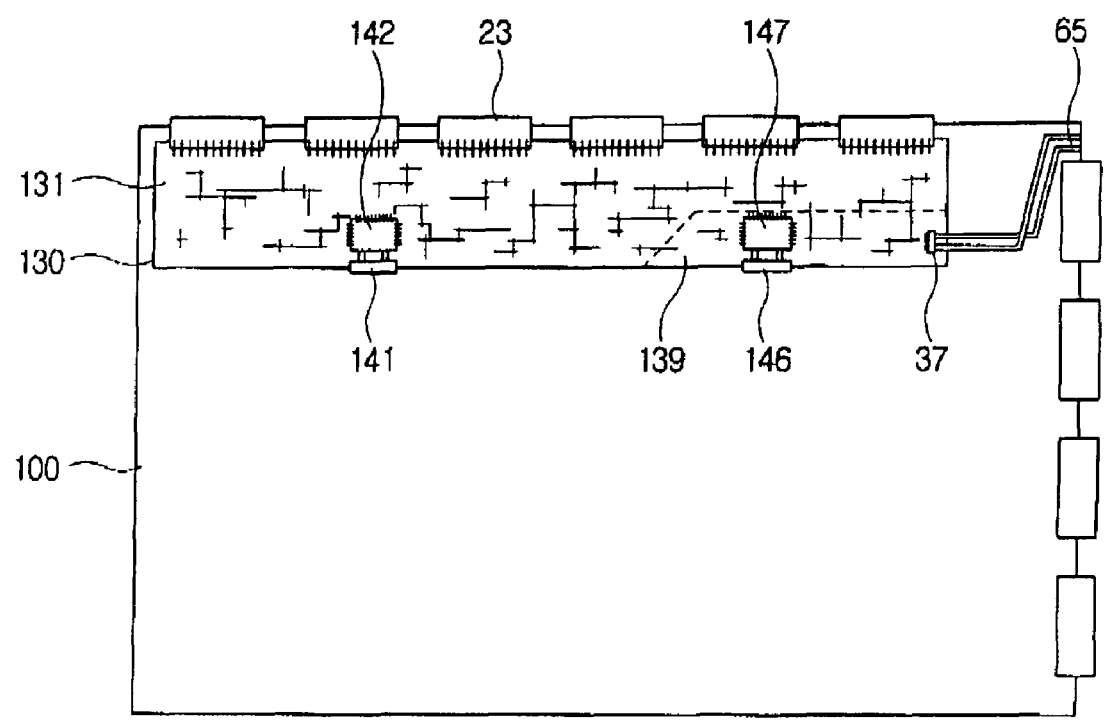
FIG. 4 is a plane view of a rear of a bottom chassis according to a second embodiment of the present invention.

FIG. 4 is a plane view of a rear of a bottom chassis according to a second embodiment of the present invention.

Referring to FIG. 4, a driving circuit part 131 and an inverter 139 are respectively provided on the same circuit board 130. Voltage providing connectors 141, 146 and voltage converters 142, 147 are respectively provided on the driving circuit part 131 and on the inverter 139.

Generally, the voltage providing connector 141 of the driving circuit part 131 is applied with a desired voltage, for example, 3.3V voltage, and converts the desired voltage into at least one of a gate-on voltage, a gate-off voltage and a reference voltage (VADD) which is needed in the voltage converter 142. The reference voltage (VADD) is converted into a common voltage, a gray scale voltage and a voltage needed in the driving circuit part 131. Usually, 21V for the gate-on voltage, −7V for the gate-off voltage and 8V~12V for the reference voltage are used respectively. As the voltage converter 142 of the driving circuit part 131 generates the aforementioned high voltage and the high reference voltage (VADD) to improve image quality and response time, the voltage converter 142 is electrically loaded. Therefore, power consumption increases.

In the exemplary embodiment, the driving circuit part 131 and the inverter 139 are provided on the same circuit board 130. The voltage converter 142 of the driving circuit part 131 is planned to convert voltages inputted through the voltage providing connector 141 into the gate-on voltage and the gate-off voltage and the voltage converter 147 of the inverter 139 is planned to convert voltages inputted through the voltage providing connector 142 into the light source driving voltage and the reference voltage (VADD). As a result, an electrical load of the voltage converter 147 may be decreased. Further, the reference voltage (VADD) converted in the voltage convert 147 of the inverter 139 is provided to the driving circuit part 131. Likewise, by providing the driving circuit part 131 and the inverter 139 in a single circuit board 130, the reference voltage (VADD) is generated in the voltage converter 147 of the inverter 139 and provided to the driving circuit part 131. As a result, power consumption may be decreased.

Furthermore, although not shown in the embodiment, the voltage providing connector and the voltage converter may be provided only in the inverter. Voltage inputted to the inverter through the voltage providing connector is converted into the driving circuit voltage and the light source providing voltage in the voltage converter and the driving circuit voltage is provided to the driving circuit part. The driving circuit voltage comprises at least one of the gate-on voltage, the gate-off voltage and the reference voltage, and is converted into at least one of the gate-on voltage, the gate-off voltage and the reference voltage in the inverter 139 and may be provided to the driving circuit part 131 or may be converted in the driving circuit part 131.

Although several embodiments in accordance with the present disclosure of invention have been shown and described, it will be appreciated by those skilled in the relevant art in light of the disclosure that changes and modifications may be made in these embodiments without departing from the principles and spirit of the present disclosure.

What is claimed is:

1. A liquid crystal display (LCD) device comprising:
   an LCD panel on which an electrode pad is provided;
   a driving part connected to the electrode pad and applying a driving signal to the LCD panel;
   a light source part providing light to the LCD panel;
   a circuit board comprising a driving circuit part applying a driving control signal to the driving part and an inverter providing a light source driving voltage to the light source part,
      wherein the inverter is disposed to one side of the same circuit board where the driving circuit part is provided; and
   a voltage converter part coupled to the circuit board and operable to receive an inputted voltage and use the inputted voltage to generate a driving circuit voltage and the light source driving voltage,
      wherein the driving circuit voltage is provided to the driving circuit part and the light source driving voltage is provided to the inverter.

2. The LCD device according to claim 1, further comprising a light guiding plate disposed on the LCD panel and a bottom chassis accommodating the light guiding plate,
   wherein the light source part is disposed along one side of the light guiding plate.

3. The LCD device according to claim 2, wherein the circuit board is disposed on a rear surface of the bottom chassis where the light source part is disposed.

4. The LCD device according to claim 1, wherein the voltage converter part comprises a single voltage converter located on the circuit board.

5. The LCD device according to claim 4, wherein the voltage converter comprises a transformer converting a direct current voltage into an alternating current voltage.

6. The LCD device according to claim 1, wherein the voltage converter part comprises:
   a first voltage converter structured to convert voltages inputted from outside into a driving circuit voltage provided to the driving circuit part; and
   a second voltage converter structured to convert the voltage inputted from outside into the light source driving voltage provided to the inverter.

7. The LCD device according to claim 6, wherein the driving circuit voltage comprises at least one of a gate-on voltage, a gate-off voltage and a reference voltage.

8. The LCD device according to claim 1, wherein the light source part comprises a light source irradiating light to a rear surface of the LCD panel and wires connecting the light source and the inverter, respectively, and the inverter generates a light source controlling signal to control and drive the light source part and has a connecting terminal connected to the wires.

9. The LCD device according to claim 1, wherein the light source driving voltage comprises an initial driving voltage turning on the light source part, a normal driving voltage applied to the light source part after the initial driving voltage is applied, and an excess driving voltage applied when the light source part is not driven by the initial driving voltage.

10. The LCD device according to claim 8, wherein the connecting terminal is disposed on one edge of the circuit board.

11. The LCD device according to claim 1, wherein the light source part comprises one of a CCFL (Cold Cathode Fluorescent Lamp) and an EEFL (External Electrode Fluorescent Lamp).

12. The LCD device according to claim 1, wherein the driving circuit part and the inverter are respectively provided by the surface mount technology (SMT) on the same circuit board.

13. The LCD device according to claim 1, wherein a voltage-providing connecter and a voltage converter are provided on the driving circuit part, and the voltage converter converts voltages inputted through the voltage-providing connector into a gate-on voltage or a gate-off voltage.

14. The LCD device according to claim 1, wherein a voltage-providing connector and a voltage converter are provided on the inverter and the voltage converter coverts voltages inputted through the voltage-providing connector into a light driving voltage and a reference voltage, respectively.

15. The LCD device according to claim 14, wherein the reference voltage is applied to the driving circuit part.

16. The LCD device according to claim 1, wherein a voltage-providing connector and a voltage converter are provided on the inverter, and the voltage converter converts voltages inputted through the voltage-providing connector into a driving circuit voltage and a light-providing voltage, respectively.

17. The LCD device according to claim 16, wherein the driving circuit voltage comprises at least one of a gate-on voltage, a gate-off voltage and a reference voltage and is applied to the driving circuit part.

* * * * *